United States Patent [19]
Angal et al.

[11] Patent Number: 6,064,656
[45] Date of Patent: May 16, 2000

[54] DISTRIBUTED SYSTEM AND METHOD FOR CONTROLLING ACCESS CONTROL TO NETWORK RESOURCES

[75] Inventors: Rajeev Angal, Santa Clara; Sai V. S. Allavarpu, Pleasanton; Shivaram Bhat, Cupertino; Bart Lee Fisher, Sunnyvale; Ping Luo, Union City, all of Calif.

[73] Assignee: Sun Microsystems, Inc., Palo Alto, Calif.

[21] Appl. No.: 08/962,089

[22] Filed: Oct. 31, 1997

[51] Int. Cl.[7] .................................................. H04L 12/28
[52] U.S. Cl. .......................................... 370/254; 709/213
[58] Field of Search ..................................... 370/254, 410, 370/431, 432, 438, 439, 466, 469; 340/825.31; 707/1, 9, 10, 100, 103, 104; 709/201, 213, 224, 228, 230, 300, 303, 304

[56] References Cited

U.S. PATENT DOCUMENTS

| | | | |
|---|---|---|---|
| 4,937,784 | 6/1990 | Masai et al. | 364/900 |
| 5,263,165 | 11/1993 | Janis | 395/725 |
| 5,265,221 | 11/1993 | Miller | 395/725 |
| 5,335,346 | 8/1994 | Fabbio | 395/600 |
| 5,742,759 | 4/1998 | Nessett et al. | 395/187.01 |
| 5,889,953 | 3/1999 | Thebaut et al. | 395/200.51 |
| 5,987,506 | 11/1999 | Carter et al. | 709/213 |

*Primary Examiner*—Hassan Kizou
*Assistant Examiner*—Duc Ho
*Attorney, Agent, or Firm*—Gary S. Williams; Pennie & Edmonds LLP

[57] ABSTRACT

An access control database defines access rights through the use of access control objects. The access control objects include group objects, each defining a group and a set of users who are members of the group, and rule objects. Some of the rule objects each specify a set of the group objects, a set of the management objects, and access rights by the users who are members of the groups defined by the specified set of the group objects to the specified set of management objects. A plurality of access control servers are used to process access requests. Each access control server controls access to a distinct subset of the management objects in accordance with the access rights specified in the access control database. At least one of the access control servers receives access requests from the users and distributes the received access requests among the access control servers for processing. A subset of the access requests specify operations to be performed on specified sets of the management objects. Each of these access requests is sent for processing to one or more of the access control servers in accordance with the management objects to which access is being requested. The access control servers responding to the access requests from the users by granting, denying and partially granting and denying the access requested in each access request in accordance with the access rights specified in the access control database.

15 Claims, 7 Drawing Sheets

|  | | Confirmed Request | | Unconfirmed Request |
|---|---|---|---|---|
|  | | Rule Type= Deny with response | Rule Type= Deny without response | |
| Scoped Operation | Atomic | Entire operation fails. A single Access_Denied response is sent back (confirmed requests always receive a response, even if denied without response). | Entire operation fails. No response is sent back. | Entire operation fails. No response is sent back. |
| Scoped Operation | Best Effort | Partial operation fails. Access_Denied response is sent back for objects which denied access. Responses sent back for objects which granted access. | Partial operation fails. No Access_Denied response is sent back for objects which denied access. Responses sent back for objects which granted access. | Partial operation fails. No response is sent back (because it is an unconfirmed request). |
| Non-Scoped Operation | | Operation fails. Access_Denied response is sent back to initiator. | Operation fails. No response is sent back to initiator. | Operation fails. No response is sent back |

FIG. 7

DISTRIBUTED SYSTEM AND METHOD FOR CONTROLLING ACCESS CONTROL TO NETWORK RESOURCES

The present invention relates primarily to the management of computer networks, and more particularly to a system and method for limiting access to a computer network's management objects to authorized users of the network management objects.

BACKGROUND OF THE INVENTION

SNMP (Simple Network Management Protocol) was developed to provide a tool for multivendor, interoperable network management. SNMP provides a set of standards for network management, including a protocol, a database structure specification, and a set of data objects. SNMP was adopted as the standard for TCPIIP-based internets in 1989.

An explanation of SNMP technology is beyond the scope of this document and the reader is assumed to be either conversant with SNMP or to have access to conventional textbooks on the subject, such as William Stallings, "SNMP, SNMPv2 and RMON," Addison Wesley (1996), which is hereby incorporated by reference in its entirety as background information.

CMIP is a network management protocol like SNMP, except that it is based on OSI standards. The book: "SNMP, SNMPv2 and CMIP: The Practical Guide to Network Management Standards" by William Stallings, which is an excellent source of basic information on CMIP, and on CMIP related standards, is hereby incorporated by reference in its entirety as background information.

Many networks use a network manager and some form of Simple Network Management Protocol (SNMP) or CMIP for managing the network. Among its management tasks, the network manager automatically monitors the status of the devices on the network. The network manager sends event requests to the devices, which are requested to return responses when certain events occur. For example, a disk agent might be requested to send a response if available disk space falls below 50%.

An SNMP-manageable (or CMIP-manageable) device stores in its memory a Management Information Base (MIB), a collection of objects or variables representing different aspects of the device (e.g., configuration, statistics, status, control). For each class of device, the MIB has a core of standard variables. Each vendor of a device will add to the core, variables that it feels are important to the management of its device.

The MIBs for the manageable devices in a network not only store management information that can be retrieved, but also contain variables whose values, when modified by a network manager, modify the operation of the device. Simple examples are disabling a device's operation, changing the priorities assigned to different tasks performed by a device, and changing the set of messages generated by the device and the set of destinations to which those messages are sent.

Clearly, it is important to prevent unauthorized persons from accessing the management information objects in a network. Otherwise, not only will confidential information be obtained by unauthorized persons, but also the network would be open to acts of sabotage. The present invention addresses the subject of access control for network management information objects.

ITU-T X.741 (1995) is an industry standard, published by the Telecommunication standardization sector of the International Telecommunication Union, previously known as the CCITT, entitled Data Networks and Open System Communications, OSI Management. The X.741 standard specifies an access control security model and the management information necessary for creating and administering access control associated with OSI (open systems interconnection) system management.

There are a number of related ITU-T standards that relate to OSI systems management that are relevant to the present invention, particularly X.740 (1992) (security audit trail function) and X.812 (1995) (data networks and open systems communications security). All three of these ITU-T standards, X.741(1995), X.740(1992) and X.812(1995) are hereby incorporated by reference as background information.

While the X.741, X.740 and X.812 standard define a fairly comprehensive access control framework for controlling access to network management objects, there remain numerous access control and management issues that are not addressed or resolved by these standards.

In particular, when a network has tens or hundreds of thousands of components (herein called objects), using a single management server to process all access requests may cause service bottlenecks. The standards discussed above do not address the subject of efficiently managing access control to management objects in large networks.

It is therefore an object of the present invention to provide a distributed access control system that can efficiently handle large numbers of access requests to a large network having tens or hundreds of thousands of management objects. While X.741 and the related standards define access control for limiting access to management objects, these standards do not address or specify any mechanism for limiting access to event reports. Event reports (usually called event notifications), such as the reports generated when an object is created, deleted, or a management parameter passes a specified threshold, in many systems are broadcast to all listeners. This is clearly unacceptable if the network is, for instance, the telephone switching network owned by a large telecommunications company, and the event reports concern resources being installed or utilized for a particular customer. That is, customer A should not be allowed to receive event reports about network resources being used on behalf of customer B.

In fact, the presumption in X.741 and the related standards is that event report security should be implemented using a mechanism that is separate from the access control mechanism used for restricting access to management objects. After all, access control to management objects filters inbound messages requesting access to objects, while event reports are outbound messages.

However, it has been observed by the inventors of the present invention that in many cases, the objects that a person is to be prohibited from accessing are also the objects from which that person should not be receiving event reports. For instance, using the above example, employees of customer A should neither access nor receive event reports for any of the objects that have been allocated to customer B.

Therefore another goal of the present invention is to provide an integrated security system for restricting access to management objects and event reports.

Finally, customers of large networks are demanding the ability to generate network management reports using "SQL" (structure query language) type report generators. That is, users of such networks want the ability to generate reports on the status of their network resources, while avoiding the complexities of network management information retrieval using SNMP (or any other network management protocol). X.741 and the related standards do not call for, or even suggest, any type of direct or SQL type access to the management object database for the purpose of generating management reports. In fact, direct SQL type access might be seen as contrary to the goals of X.741 since it is a potential source of security leaks.

It is therefore a goal of the present invention to provide direct SQL type access to the management object database for purposes of report generation, as opposed to other types of object access. The purpose of the direct access mechanism is to allow users to use standard DBMS report generators to define and generate reports about the status or past performance of network objects, while still providing the same access restrictions as those that apply to normal management information access requests.

SUMMARY OF THE INVENTION

In summary, the present invention is a system and method for controlling access to management objects in a computer network. An access control database defines access rights through the use of access control objects. The access control objects include group objects, each defining a group and a set of users who are members of the group, and rule objects. Some of the rule objects each specify a set of the group objects, a set of the management objects, and access rights by the users who are members of the groups defined by the specified set of the group objects to the specified set of management objects.

A plurality of access control servers are used to process access requests. Each access control server controls access to a distinct subset of the management objects in accordance with the access rights specified in the access control database. At least one of the access control servers receives access requests from the users and distributes the received access requests among the access control servers for processing. A subset of the access requests specify operations to be performed on specified sets of the management objects. Each of these access requests is sent for processing to one or more of the access control servers in accordance with the management objects to which access is being requested.

The access control servers responding to the access requests from the users by granting, denying and partially granting and denying the access requested in each access request in accordance with the access rights specified in the access control database.

One of the access control servers is a management information server that receives the access requests submitted by users to the access control system. The management information server partitions an access request into two or more access sub-requests when access to the set of management objects specified by the access request is controlled by two or more of the access control servers, and sends the access sub-requests to those two or more access control servers for processing. The management information server also combines responses to the two or more access sub-requests generated by the access control servers when processing the access sub-requests and returns a combined response to the user who submitted the access request that was partitioned.

A second subset of the rule objects in the access control database are used to specify access rights to the access control objects. An access control database server stores the access control database in persistent storage, receives access requests to the access control objects, and grants and denies the access requests to the access control object in accordance with the access rights specified in the access control database.

BRIEF DESCRIPTION OF THE DRAWINGS

Additional objects and features of the invention will be more readily apparent from the following detailed description and appended claims when taken in conjunction with the drawings, in which:

FIG. 7 depicts a chart for indicating how access request responses are combined when the target of an access request includes more than one management object.

DESCRIPTION OF THE PREFERRED EMBODIMENTS

Figure 1:
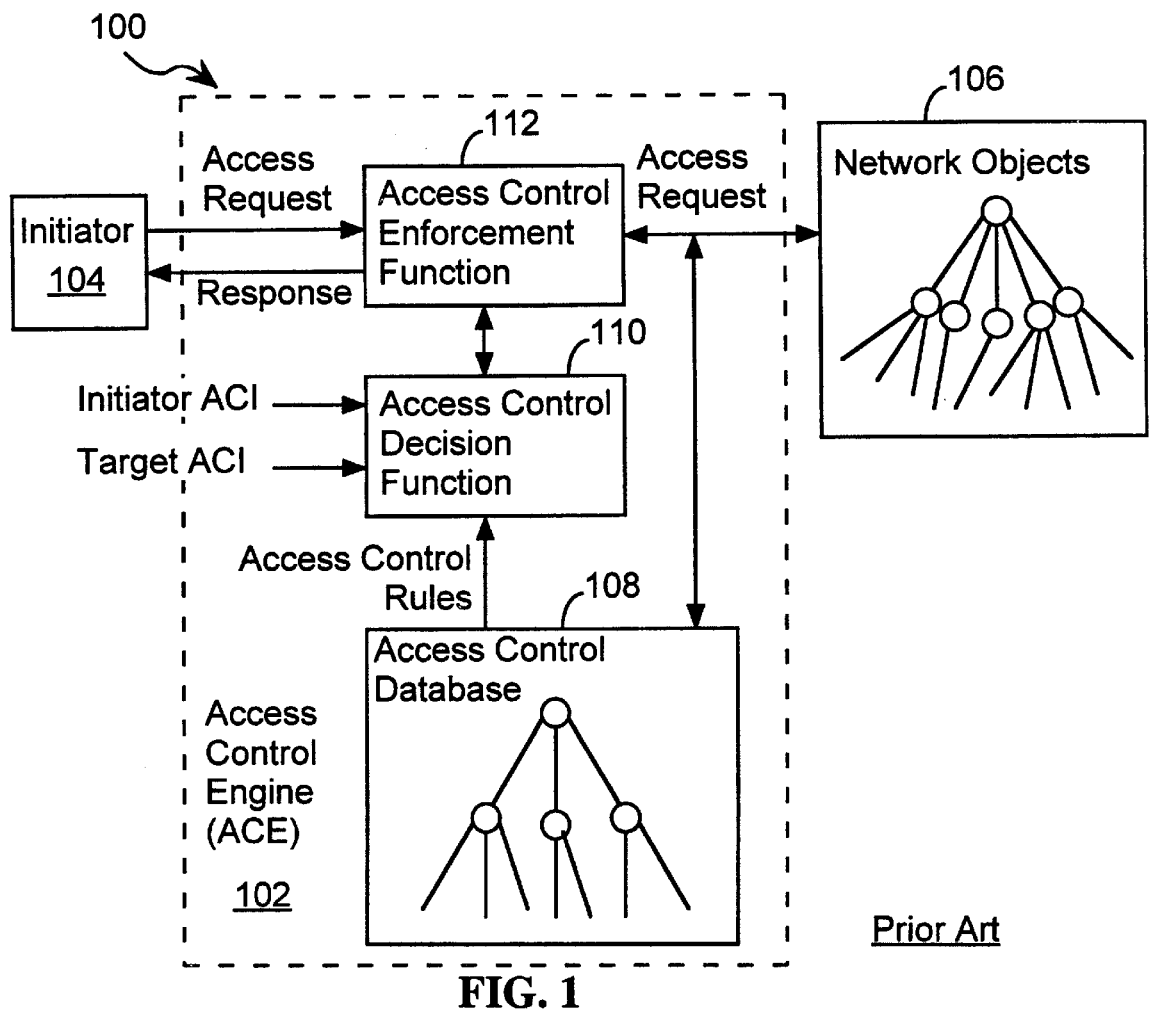
FIG. 1 is a block diagram of an access control engine for restricting access to the management objects in a network.

Referring to FIG. 1, there is shown a network management system 100 having an access control engine (ACE) 102 that restricts access by initiators 104 (e.g., users, and application programs acting on behalf of users) to the management objects in a network 106. The network 106 can be virtually any type of computer implemented network that uses a management protocol for performing management functions. For the purposes of this document, we are only concerned with the management objects in the network, which contain management information and resource control variables. Furthermore, for the purposes of this document, we are primarily concerned with methods of restricting access to management objects and to event notifications generated by management objects, and thus we are not particulary concerned with the content and functions of the management objects.

It should be noted that in many documents, management objects are called "managed object instances" (MOI's). In such documents, the abbreviations "OI" and "OC" stand for "object instance" and "object class." In the terminology of this document, an object is in fact an object instance, because every object is an instance of a respective object class. For instance, each "router management object" in a network is an instance of a respective router management object class. Except when deemed necessary for clarity, the term "object" will be used instead of "object instance" in this document. Also, in the preferred embodiment all the management objects and access control objects are GDMO compliant.

The access control engine contains an access control database 108. Like the network itself, the access control database 108 consists of a hierarchy of objects. Various aspects of the access control database, as implemented in the present invention, will be described in more detail below. The access control database 108 contains access control rules, which can be applied to access requests in order to determine whether such requests should be denied or granted.

An access control decision function (ACDF) 110 is the procedure (or set of procedures) that applies the access control rules to each access request so as to determine whether the requested access to a management object should be granted or denied. As will be discussed in more detail below, when an access request has a target of more than one management object, some portions of an access request may be granted while other portions are denied.

An access control enforcement function (ACEF) 112 is the procedure (or set of procedures) for enforcing the decisions made by the ACDF 110. In particular, the ACEF 112 sends access denial responses when the ACDF 110 returns an access denial, and forwards the access request to the appropriate network management objects when the access is granted.

Figure 2:
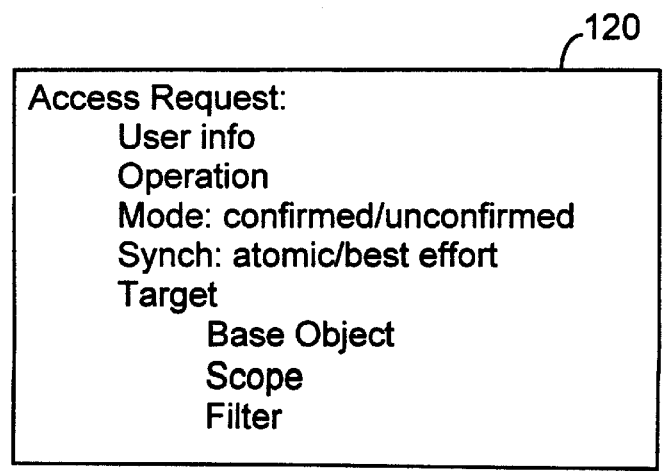
FIG. 2 depicts the data structure of an access request.

Referring to FIG. 2, each access request 120 is a data structure or object containing a set of predefined fields, including:

user information, identifying the request initiator;
operation, which is the type of operation to be performed on the specified target object(s); defined operations include get, set, create, delete, action, filter, multiple object selection, and "receive notifications from"; note that the "receive notifications from" operation (usually called the "event notification" action elsewhere in this document) is not one of the operations defined by X.741, but rather is a new operation added by the inventors for reasons that will be explained below;
mode, equal to confirmed or unconfirmed, which indicates whether or not the management information server should send response messages to the initiator; when the mode is equal to unconfirmed, response messages (e.g., access denial messages) are not sent to the initiator; when the mode is equal to confirmed, response messages are sent to the initiator;
synch, equal to "atomic" or "best effort"; if synch is set to atomic, an access request directed at more than one object is aborted if any portion of the request is denied; if synch is set to best effort, the access request is executed on the objects to which access is granted and the corresponding results are returned to the initiator; and
target, which specifies the object or objects the initiator wants to access.

The target in the access request 120 is specified by three fields:

base object, which indicates a particular object in the network management object tree;
scope, which indicates the range of objects above or below the base object in tree to be accessed; in the preferred embodiment base object is always the object in the target set that is closest to the root and the scope indicates a number of object tree levels below (i.e., further from the root) the base object that are to be included as part of the target set; and
filter, which sets out a filter condition (e.g., a filter might indicate that only management objects for routers in Menlo Park, Calif. are to be included in the target set) for restricting the set of objects included in the target set; the filter field is the equivalent of a "where" clause in an database query. A filter can also be used to specify the type of event notifications the user wishes to receive (e.g., SNMP or CMIP event notifications).

A request that has a target set of just one object, because the scope field in the request is unused, is considered to be a "non-scoped" request. A request that has a target set of more than one object, because the scope filed in the request indicates more than one object is to be accessed, is considered to be a "scoped" request.

Distribution of Access Control Over Several Servers

Figure 3:
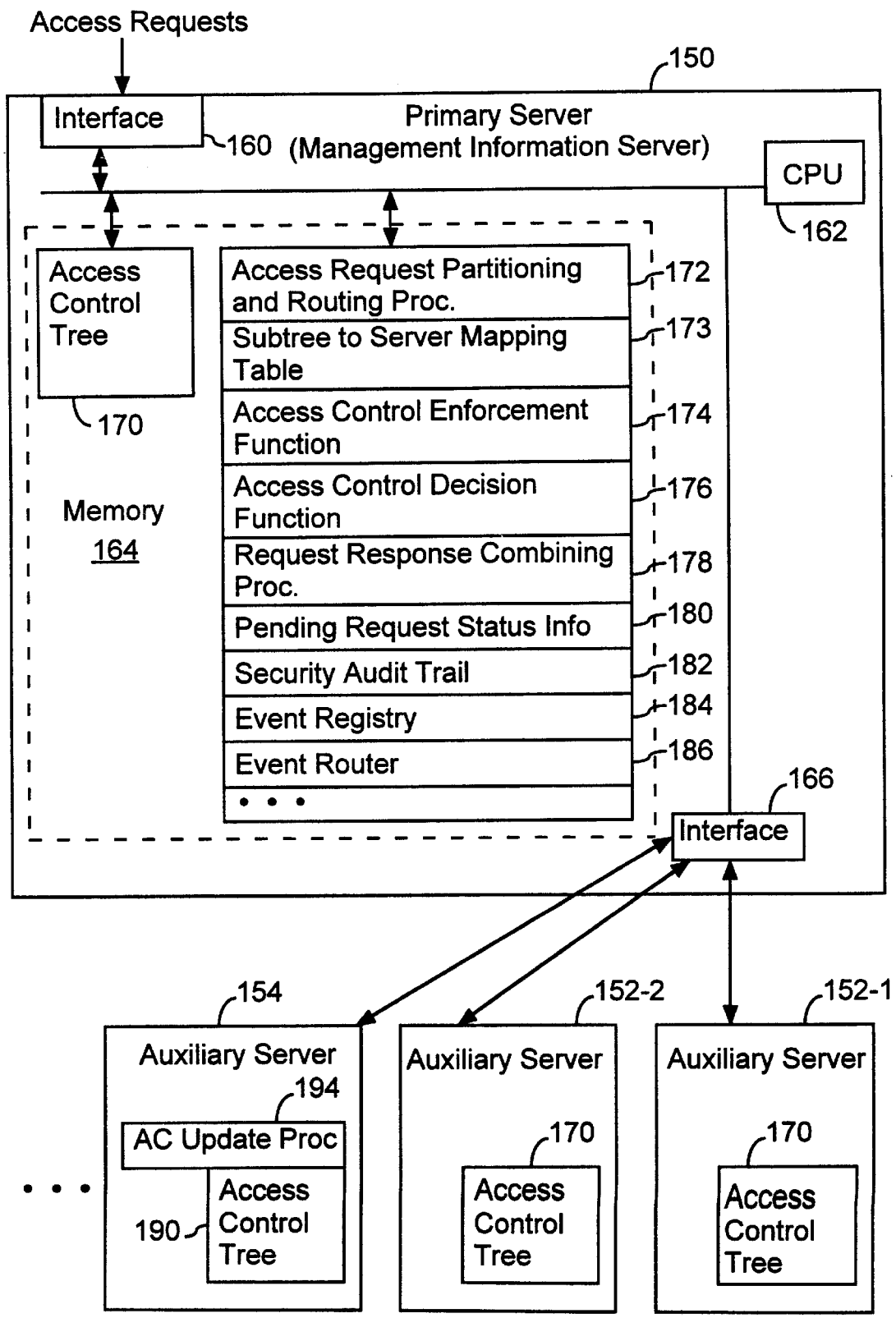
FIG. 3 depicts a distributed access control engine (ACE) in accordance with a preferred embodiment of the present invention.

Referring to FIG. 3, the functions of the access control engine 102 (FIG. 1) are distributed over a plurality of servers so as to increase the speed with which access control is handled. It should be understood that the following explanation of FIG. 3 will contain brief "overview" explanations of the functions performed by some of the system components shown in FIG. 3, and that more detailed explanations of those aspects of the invention not specified in the above referenced standards (e.g., X.741) will be provided in other sections of this document.

In many instances, such as telephone networks, the number of network management objects is extremely large, the number of persons requiring access to the management objects is correspondingly large, as is the daily volume of access requests. Most access requests are fairly narrowly focused. For instance, a typical access request will request access to the management objects of a particular type at a particular location. In another example, if a part of the network needs to be shut down for repairs, the target set for the access request will designate the management objects for the devices to be shut down. Other access requests, especially status information gathering requests, can include very large target sets.

A management information server (MIS) 150 receives all management object access requests 120, and distributes each request, or portions of the request, to a set of auxiliary servers 152 in accordance with the portion(s) of the management object tree referenced by the request. Each server 150 and 152 performs both access control functions and the request response gathering functions. Thus, access control processing is divided among the MIS 150 and auxiliary servers 152, enabling faster processing of access requests during periods of heavy request traffic.

In particular, the MIS 150 only performs access control for objects at the top of the management objects tree, while each of the auxiliary servers performs access control for objects in respective designated subtrees of the management objects tree. One important exception to the above statement is that all access requests for event notifications (i.e., with an operation of "receive notification from") are delivered to an event registry module in the MIS, regardless of which objects are the targets of the access request. This is discussed in more detail below with respect to event notification access control.

In addition, a special auxiliary server 154 is used to handle all updates to the access control object tree 170

(which is not the same as the prior art access control tree 108, for reasons that will be explained below). In some implementations, the special auxiliary server 154 may be merged with the MIS 150 or one of the regular auxiliary servers 152. Alternately, in systems with relatively low access request traffic, the special auxiliary server 154 can be implemented as a separate software entity on the same physical server hardware as one of the other servers.

The MIS 150 and each auxiliary server 152, 154 stores a full copy of the access control object tree 170, but is responsible only for processing requests to access a respective portion of the network management object tree. In an alternate embodiment, each of the MIS and auxiliary servers could store just the portion of the access control object tree 170 needed to perform its assigned access control functions.

If an access request has target objects in the portions of the management object tree that are serviced by more than one server, the access request is split into access sub-requests by the MIS 150 and sent to the appropriate auxiliary servers 152. The access sub-request responses generated by all the servers are collated by the MIS 150 and returned together to the requesting user or application.

The MIS 150 includes:

an interface 160 for receiving access requests;

one or more central processing units (CPU's) 162 for executing access control procedures stored in the MIS's memory 164;

memory 164, including both volatile high speed RAM and non-volatile storage such as magnetic disk storage;

an interface 166 for handling secure communications between the MIS 150 and the auxiliary access control servers 152, 154; and one or more internal busses 168 for communicating data and programs between the above referenced elements of the MIS 150.

The memory 164 may store:

a partial or complete copy 170 of an access control tree; it should be noted that the access control tree 170 in the preferred embodiment has different components and organization than those specified in X.741, and therefore the access control tree 108 in FIG. 1 is not the same as the access control tree 170 used in the present invention;

an access request partitioning and routing procedure 172 for partitioning access requests into access sub-requests and routing the access sub-requests to the appropriate server(s) for access control processing;

a subtree to server mapping table 173, which stores the information necessary for the MIS 150 to determine the server or servers to which each access request should be sent for access control processing;

an access control enforcement function 174, whose functionality is the same as that of the ACEF 112 shown in FIG. 1;

an access control decision function 176, whose functionality is the same as the of the ACDF 110 shown in FIG. 1;

a request response combining procedure 178 for merging the responses generated by the various servers to each distinct access request and return a single, combined response to the initiator;

an array 180 of status information about access requests whose processing has not yet been completed;

a security audit trail 182, for keeping a record of all access requests;

an event registry 184, which is a mechanism for keeping track of event notifications that particular users have requested; and an event router 186, which is a module for sending event notifications to users or applications who have (A) requested those event notifications, and (B) who are authorized to receive them.

Other aspects of the MIS 150 not shown in FIG. 3 will be described below.

The MIS 150 and auxiliary servers 152, 154 all maintain identical copies of a library of access control procedures as well as a copy of the access control object tree 170.

Thus, each auxiliary server 152, 154 includes the same hardware and software elements found in the MIS 150, except for (A) the special procedures (172, 178) in the MIS used for handling the receipt and partitioning of access requests, and the combining of responses, and (B) they each have just one interface 160/166 for receiving access requests and returning responses. Each auxiliary server 152 retains either a complete copy 170 of the access control object tree, or the portion of it needed to handle the access requests to be handled by that auxiliary server.

The special auxiliary server 154 maintains a copy 190 of the access control object tree 170 in persistent storage so that the access control objects are available for use by all the access control servers whenever the access control system, or any portions of it, is re-booted or restarted for any reason. The special auxiliary server 154 is also responsible for handling all updates to the access control object tree 170.

In addition to the access control library procedures shared with the other servers, the special auxiliary server 154 has an additional procedure 194 for handling access control to the access control object tree 170/190 and for handling updates of the access control object tree 170/190. The same type of access control that is used to restrict access to management objects is also used to restrict access to the access control object tree 190/170. In other words, some of the target objects and rule objects in the access control object tree 170 are used to define access rights to the access control objects, and the special auxiliary server 154 restricts access to the access control objects in accordance with the rules defined by those access control objects. In this way only authorized users can access and update the access control object tree 190/170.

The MIS 150 has enough knowledge of the object tree in the network to know which auxiliary servers are needed to service each request. In particular, the MIS 150 has an access request partitioning and routing procedure 172 and a mapping table 173 that stores information identifying a set of "tree division point objects" (also called division point nodes). More specifically, the mapping table 173 contains a sequence of records. Each record identifies a management object subtree, identified by a topmost object called a tree division point object, and also identifies the server 152 for handling the access requests to objects in that management object subtree. For each access request, the MIS 150 first applies the "global deny rules," as will be explained in more detail below. If the request is not rejected by a global deny rule, the MIS 150 then traverses the network object tree 170 so as to identify the server or servers required to further process the access request.

More specifically, for each received access request (other than access requests for event notifications) the MIS traverses the network object tree until it reaches any of the division point objects. Since all management objects below the division point objects are to be processed by a corresponding auxiliary server, the tree traversal stops at those objects. Depending on how the access management duties have been divided among the servers, it is possible that a single access request will have to be partitioned into two or more access sub-requests and sent to two or more of the servers for further processing. When a request is partitioned for processing by more than one server, the base object and scope portions of the each partition of the access request (i.e., each sub-request) are modified so as to only encompass the portion of the management object tree serviced by the corresponding server.

The MIS 150 also maintains status information 180 on each access request whose processing is not yet completed. The status information 180 identifies all the servers from which partial responses are needed before a complete response can be returned to the initiator.

Depending on the implementation, the MIS 150, in addition to applying the global deny rule to each request, may also be responsible for restricting access to various portions of the management object tree not allocated to any of the auxiliary servers. For instance, the MIS 150 will typically be responsible for restricting access to the root node of the management object tree and can also be made responsible for any particular branch of the management object tree.

In an alternate embodiment, access control responsibilities could be divided among the servers in other ways, for instance on the basis of the type of operation to be performed on the target objects. Thus, one server might be responsible for handling set operations, another create and delete operations, and so on.

The access security rules are stored in persistent storage, with recently used portions also stored in cache memory, at the MIS 150 and each auxiliary server 152. Whenever any access control rule is updated, deleted or added to the system, the rule base in every auxiliary server is updated in synchronized fashion using an event propagation mechanism that is also used for handling other types of event messages. The process for updating the access control tree 108 will be explained in more detail below.

The Access Control Database

While X.741 indicates that object access is to be controlled on a user by user basis, the present invention controls object access on a group by group basis. The user group feature helps to greatly reduce the amount of data required to define each access rule. Each user authorized to access information in the system is assigned to one or more groups. Access rules are defined in terms of access rights of groups. For instance, object parameter reading rights are likely to be assigned using different groups than object parameter setting rights. Also, rules are typically defined hierarchically with respect to these groups, for instance denying access to Customer A's subtree of objects to everyone who is not either a Customer A group member or a system administrator group member, and then further defining rights to objects within Customer A's subtree in accordance with groups of users set up by Customer A.

Figure 4:
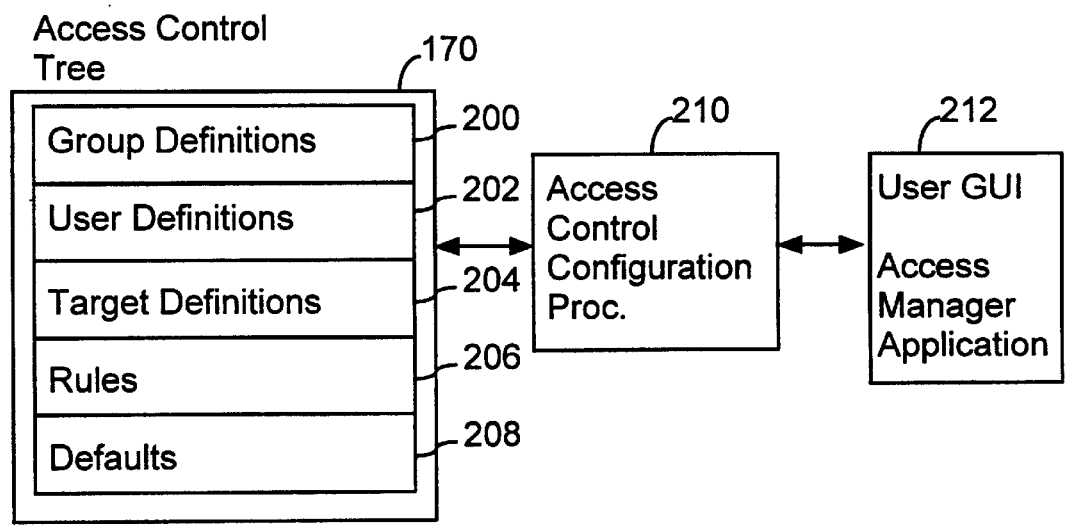
FIG. 4 depicts the access control database and a mechanism for adding objects to the database and for modifying the objects already in the database.

Referring to FIG. 4, the primary components of the access control tree 170 are group definitions 200, user definitions 202, target definitions 204, access rules 206, and default rules 208.

Each group definition 200 is represented by a group object, having the following fields:
group name; and
a list of users included in the group.
The group objects are used to map groups to users.

Each user definition 202 is represented by a user object, having the following fields:

user name; and
list of groups of which the user is a member.
The user objects are used to identify all the groups to which a particular user belongs.

It should be noted here that the term "users" includes entities other than users that can be granted access rights. For instance, the auxiliary servers, the log server,.and even objects in the system can be set up as "users" for the purpose of defining access rights to be accorded to those entities.

Each target definition 204 is represented by a target object, having the following fields:
target name; and
a list of base management objects that are to be included in the target set identified by this target object;
a list of management object classes; this field is used only when a target set includes all the management objects of a particular class, subject to the filter condition (see below);
scope, indicating the number of management object tree levels below the listed base management objects that are to be included in the target set; and
a filter, which is an optional field used to restrict the set of objects included in the target set; the filter field is the equivalent of a "where" clause in an database query; and
an operations list, which lists the operations (get, set, etc.) for which the target set is applicable.

Each rule definition 206 is represented by a rule object, having the following fields:
a rule name for identifying the rule;
a group list, that identifies all the user groups to which the rule is applicable;
a targets list, which is a list of the target objects to which the rule is applicable; and
an enforcement action, indicating whether the specified groups of users have or do not have access to the specified target set; in a preferred embodiment the enforcement action can be set to Deny with Response, Deny without Response, or Grant.

Default rules 208 are represented by a default rules object, having the following fields:
a list of default enforcement actions for a corresponding predefined list of operations (e.g., get, set, create, delete, etc.); the most typical list of default enforcement actions is to deny access for all operations types, but in some implementations the system administrator might decide to make the default for some operations, such as the get operation, to be "grant";
a default enforcement action for event notifications; and
a default denial response (i.e., deny with response or deny without response).

The defaults 208 are default responses that are defined for each operation when no rule has been defined that applies to a particular access request. For instance, the defaults could be set to "Grant" access requests whose operation is "Get", and to "Deny with Response" access requests whose operation is anything other than "Get". However, it is expected that in most implementations all the defaults will be set to either "Deny with Response" or "Deny without Response". The defaults 208 are preferably defined by a single Default object which contains a grant or deny flag for each of the defined operations. Each "rule" in the access control tree either grants or denies access by certain groups of users (identified by the group objects referenced in the rule object) to a set of target objects, specified by a target object referenced in the rule object. Unlike X.741, access rules are not defined on a user by user basis, but instead on a group by group basis. As a result, as particular users join and leave the employment of a company using the present invention, only the user and group objects need to be updated, instead of having to update all the rule objects that applied to those users.

In addition to rule objects that specify a set of target management objects, the system can have one global deny rule object and one global allow rule object. Each of the global rule objects has the same structure as a regular rule object, but has any empty target list field, which indicates the rule is a global rule. The global deny rule, if defined, specifies groups of users that cannot perform any operations on any management objects. The global grant rule, if defined, specifies groups of "super users" (e.g., system administrators) that are allowed to perform all operations on all management objects.

Whenever an object in the access control tree 170 is added, deleted or modified, other access control objects may also have to be modified in order to keep the access control tree 170 self-consistent. For instance, if a user object is modified to delete all the groups previously included in the user object's group list and to make the identified user a member of a previously defined "DenyAll" group, all the group objects that used to be listed in the user object will have be updated to delete this user from their user lists, and the DenyAll group object will need to be updated by adding this user to its user list. In another example, if a target object is deleted from the access object tree 170, then all the rule objects that reference the deleted target object will need to be modified so as to remove the deleted target object from their target object lists.

In order to ensure that the access control object tree 170 is maintained in a self-consistent state, all changes to the access control object tree 170 are performed by a procedure called the Access Control Configuration procedure 210. The Access Control Configuration procedure 210 presents a graphical user interface 212 to users authorized to modify the access control tree 170. The Access Control Configuration procedure 210 allows the authorized user to navigate, inspect and modify the access control tree 170. Each time the authorized user specifies a change to be made to the access control tree 170, the Access Control Configuration procedure 210 also makes all the other changes to the access control tree 170 required to keep it self-consistent.

Applying Access Control Rules to Requests

Figure 5:
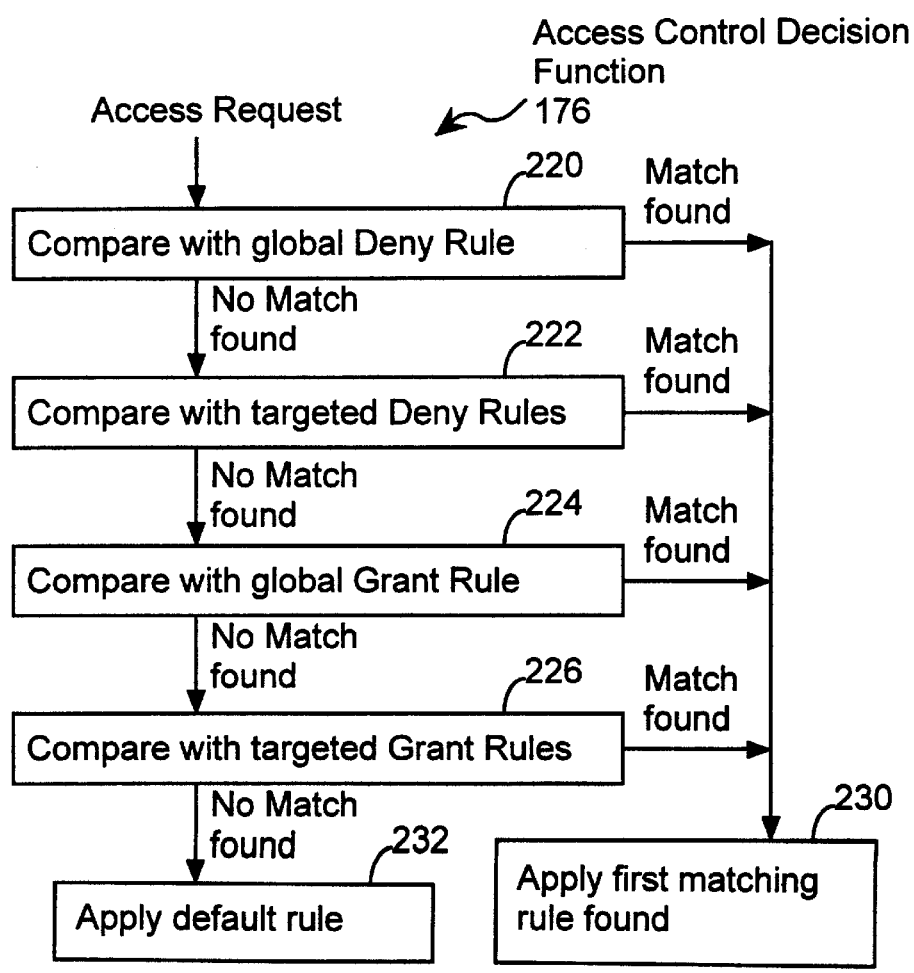
FIG. 5 depicts the order in which access rules are applied for processing each access request.

Referring to FIG. 5, the operation of the access control decision function 176 will first be explained without considering the impact of partitioning requests for processing by one or more servers. Later, request partitioning and the division of duties among the servers will be explained.

When an access request is received, the access request is compared successively with the global deny rule (step 220), the targeted deny rules (step 222), the global grant rule (step 224), and the targeted allow rules (step 226), in that order. The first rule found that matches the access request is applied to it (step 230). If no matching rule is found, then the appropriate default rule is applied (step 232).

By applying the deny rules first, and then the grant rules, access denial rules are given higher priority than access grant rules. Also, this structure makes it relatively easy to define a set of access rules to grant certain access rights to a broad group of users, but then specify subgroups to whom those access rights should be denied.

When an access request has a target set with more than one target object, different rules may apply to different ones of the target objects specified by the request. In that case, the first rule found that is applicable to each particular target object or subgroup of target objects is applied to that target or subgroup of targets. As a result, some portions of an access request may be granted, while others are denied.

Figure 6:
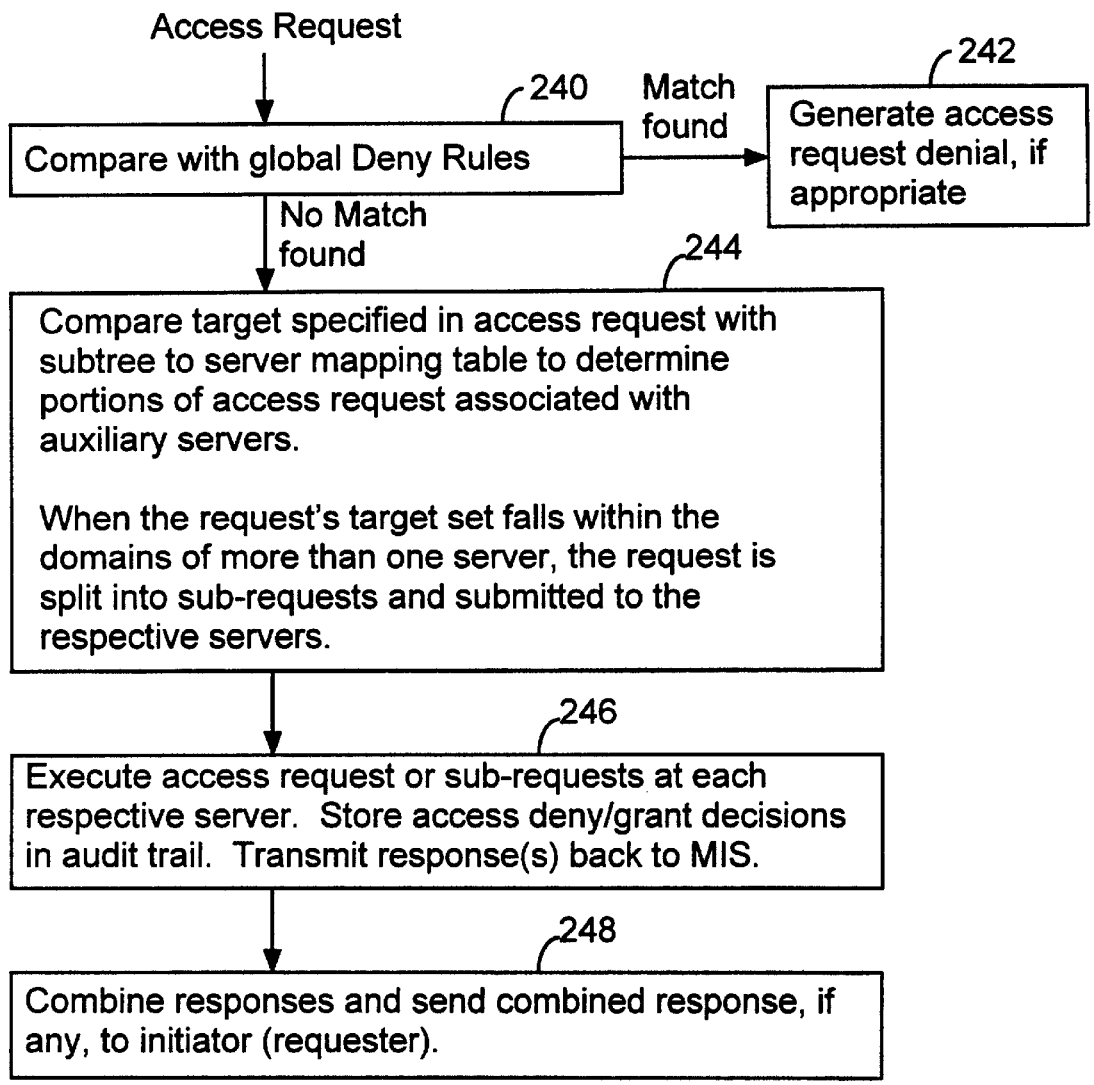
FIG. 6 depicts a procedure for processing an access request, dividing it among the responsible access servers, collating the responses and returning a combined response to the initiator.

Referring to FIG. 6, there is shown the sequence of actions performed by the access request partitioning and routing procedure 172, the access control decision and enforcement functions 176, 174, and the request response combining procedure 178. Note that this discussion does not apply to access requests for event notifications, which are handled separately by the event registry.

Each access request is received by the MIS 150, which then compares the access request with the global deny rule (step 240). If a match is found, the request is denied, and a response is returned to the initiator if appropriate (step 242). No response is returned to the initiator when (A) the applicable global deny rule specifies an enforcement action of "Deny without Response", or (B) the request itself specifies an "unconfirmed" mode.

If no match was found with the global deny rule, the MIS compares the target set specified in the request with the subtree to server mapping table 173 to determine the server or servers to which the request will be sent for processing (step 244). If the request's target set falls within the domain of more than one server, the access request is partitioned into sub-requests, and each sub-request is then sent to its respective server. When a request is partitioned, the target set in the original request is adjusted for each sub-request so as to only specify target objects with the domain of the associated server.

If the request's target set falls within the domain of a single server, the entire request is forwarded to that one server for processing. In some instances, the server for processing the request will be the MIS, in which case the request is added to the end of the MIS's local request queue. Each auxiliary server which receives a request from the MIS puts the received requests on its local request queue for processing. The MIS maintains a status information array 180 (FIG. 3) for all outstanding access requests, with an indication of the server or servers to which they have been sent for processing.

At each server to which an access request is sent for processing, the access request is executed by performing the access control decision function and then the access control enforcement function. More particular, referring back to FIG. 5, steps 222 through 232 of the access control decision function are performed at each server, since step 220 has already been performed by the MIS. The deny/grant decision for each access request may be stored in a security audit trail.

In a preferred embodiment of the present invention, the access control decision function can be configured, through the use of a global configuration parameter, to invoke any one of the following levels of "logging" of access decisions in the security audit trail: (A) off, with no information being logged, (B) storing summary information about access request grants and denials, denoting only the identity of the initiator, the requested operation, and the target object or set of objects to which access was granted or denied, and (C) a full logging level in which, for each access request grant or denial the entire access request is logged as well as full information about the target objects to which access was granted or denied.

At each server, the responses generated by requests and sub-requests are determined and sent back to the MIS (step 246). Finally, at the MIS, if a request was partitioned into two or more sub-requests, the responses are combined and the combined response, if any, is returned to the initiator (step 248). If a request was not partitioned, the response, if any, is forwarded to the initiator. Also, the access request is deleted from the pending request status table 180 (FIG. 3).

Combining Responses When A Request has More than One Target Object

FIG. 7 is a chart indicating how access request responses are combined when the target set of an access request includes more than one management object. The chart in FIG. 7 is applied only when access to at least one target object specified by a request has been denied. When access to all the target objects is granted, the responses generated by all the target objects are simply combined and returned to the initiator.

When there is only one object in the target set of a request, corresponding to the "non-scoped operation" row of the chart in FIG. 7, there is no need to combine responses. If the request is a confirmed request the access denied response generated by the applicable rule is returned to the initiator. If the response generated by the applicable rule is a "deny without response", then no response is returned. If the request is an unconfirmed request, no response is returned regardless of whether the request is granted or denied.

When a request specifies more than one target object, corresponding to the "scoped operation" portion of the chart in FIG. 7, the type of response returned depends on the request's synch parameter. If the request is an atomic request, when access to any of the target objects is denied the entire operation fails. If the request is a confirmed request, a single "access denied" response is returned to the initiator. Otherwise, if the request is an unconfirmed request, no response is returned to the initiator.

When the request specifies more than one target object "scoped operation" ) and specifies a "best effort " synch mode, the responses generated by the objects for which access is granted are returned to the user. For each object to which access is denied, an "access denied" response is returned if the request is a confirmed request and the applicable rule has an enforcement action of "deny with response". Otherwise, if the applicable rule has an enforcement action of "deny without response", no response is returned for the object(s) to which access is denied.

Finally, if the request was an unconfirmed request, no response is returned to the initiator regardless of which portions of the request were granted and which were denied. It should be noted that an unconfirmed request cannot have a "get" operation, since by definition the purpose of a "get" response is to retrieve information.

The response combining operation summarized in FIG. 7 is performed first at each server 150, 152 where the request or sub-request is processed, and again at the MIS for those requests that are partitioned into sub-requests. For atomic access requests that are partitioned and processed at more than one server, the access control enforcement function is performed only after the results for the access control decision function have been combined by the MIS. When an access request is processed at just one server (i.e., all its target objects fall within the domain of a single server 150, 152), the response combining operation is performed only by the server processing the request.

Limiting Access to Event Notifications

In the present invention, access to Events (Notifications) is controlled in the same way as access to objects, using rules in the access control rule base. X.741 does not include event notifications as one of the types of operation types to which the access control mechanism of X.741 is applicable. An example of the event notification access control problem is as follows: a telephone network provider does not want customer A to receive notifications about new network resources installed for customer B, but customer A registers itself to receive all event notifications.

The present invention solves the event notification access control problem by (A) adding event notifications to the set of operation types that are governed by rules in the access rules database, and (B) adding a filtering mechanism to the system's event router that filters event notification messages based on the rules in the access rules database.

Thus, when a target object is defined in the access control object tree 170, one of the operations that can be specified in the target object's operations list is "event notifications". In a preferred embodiment, the event notification operation specified in a target object can either specify all event notifications for a set of specified management objects, or it can specify certain specific types of event notifications by using the filter field of the target object to specify the types of event notifications to be included in the target object. For instance, a target object might apply to SNMP or CMIP generated events, but not to other types of events such as object creation and deletion events.

Further, a particular target object can be used to define access rights to a set of management objects for several operations including event notifications. For instance, a target object that is to be used with a deny rule for denying access to any and all information regarding a particular set of management objects will typically include event notifications in its list of operations. Alternately, when appropriate, separate target objects can be used to define event notification access rights.

Figure 8:
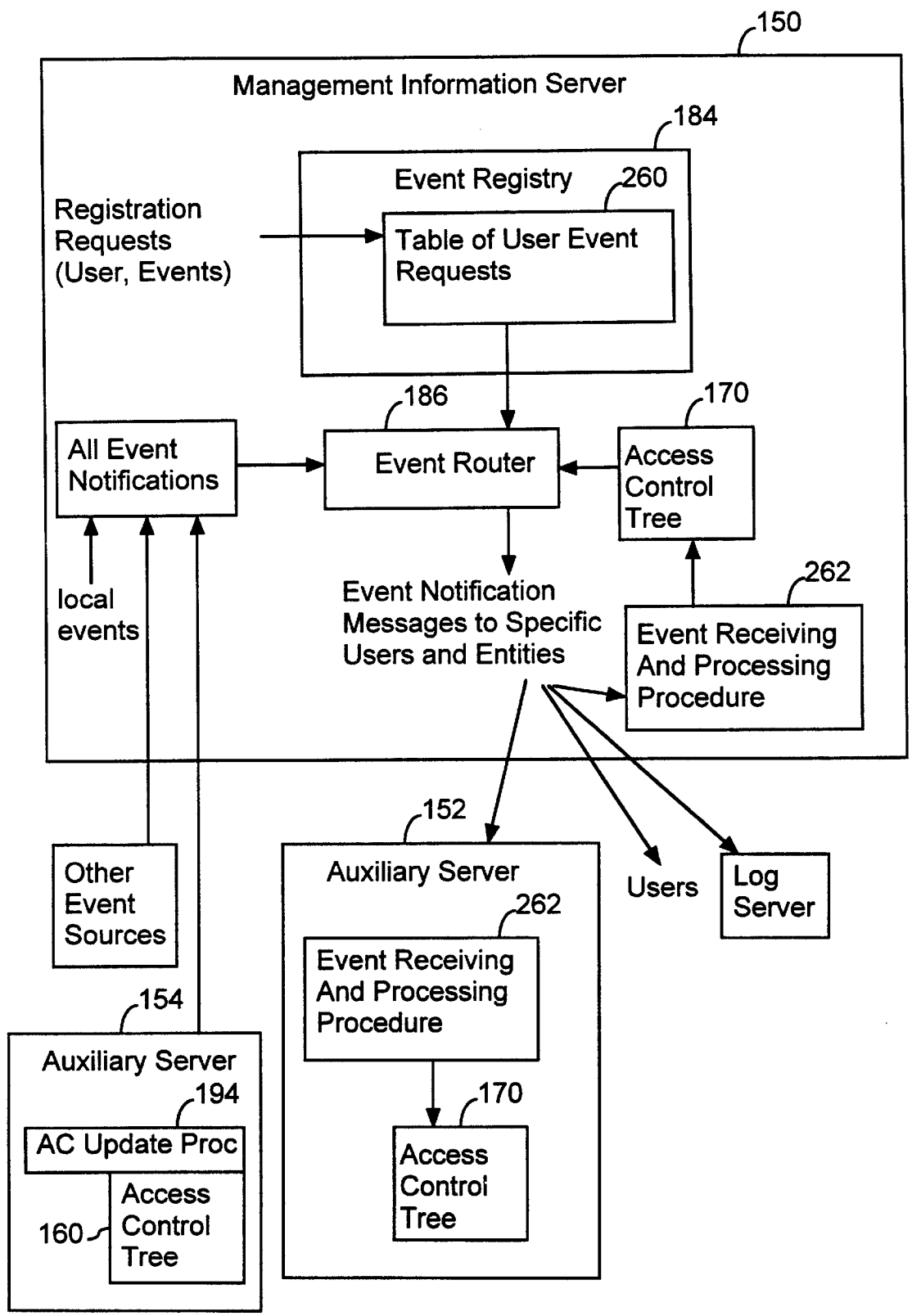
FIG. 8 depicts the event registry and event router portions of a management information server in a preferred embodiment of the present invention.

Referring to FIG. 8, the MIS 150 maintains an event registry 184. More accurately, the event registry 184 is a software module that maintains a table 260 of user event requests. The MIS directs all access requests whose specified operation type is "event notification" to the event registry 184, regardless of which objects are specified by the request. The table 260 stores information denoting, for specified event notifications that can be generated by either the management objects or the access control objects, which users or other entities have registered a requested to receive copies of those event notifications. The event registry table 260 only stores information about events that users and other entities have requested. The event notification registration requests (which are access requests with an operation type equal to "event notification") can be specified either in terms of specified objects, specified classes of objects, or specified subtrees of objects. Thus, for instance, a user could request receipt of all event notifications for router objects (i.e., which is a class of objects), and could further specify a filter, such as only routers located in the state of California or routers manufactured by a particular company. Users and entities can also revoke prior requests.

In the preferred embodiment, the event registry 184 only checks registration requests to ensure that the requests are semantically correct and that the specified objects for which events are requested actually exist. Thus, in the preferred embodiment the event registry 184 does not check to see if the user or entity making a registration request has the security clearance to actually receive the requested notifications. That job is given to the event router 186, which checks event notification access rights at the time each event notification is being processed. As a result, any changes in a user's access rights to event notifications are taken into account by the event router and do not affect the information stored in the event registry 184.

Entities other than users that can register to receive event notifications include: the MIS 150 and auxiliary servers 152, the log server (which will be discussed below), and even objects (e.g., database objects, which are discussed below) that are part of the access control engine.

All event notifications, including event notifications generated by management objects (indicated by "other event sources" in FIG. 8) and event notifications generated by access control objects (indicated by the special auxiliary server 154 in FIG. 8), are delivered to the event router 186 in the MIS 150. The event router 186 also has access to the access control tree 170 and the table of user event requests 260 in the event registry 184. For each event notification received by the event router 186, the event router first determines which users and entities have requested a copy of that event notification, and then determines which of those users and entities have the right to receive those event notifications. The determination of access rights to event notifications is performed using the access control decision function, as shown in FIG. 5. Thus, the event router looks, in sequence, at the global deny rule, the targeted deny rules, the global grant rule and the targeted grant rules until a matching rule is identified. A default rule is applied if not matching rule is found. A matching rule must (A) apply to the "event notification" operation, (B) apply to the object that generated the event notification, and (C) apply to a group of which the requester is a member.

For each requester of an event notification that has access rights to that event notification, the event router generates a corresponding event notification message, each of which is addressed to a single authorized user or entity. Thus a single event notification may result in zero event notification messages, or many, depending on the number of requesters with corresponding access rights.

One specific application of the event registry 184 and event router 186 used in the preferred embodiments is as follows. There is a special auxiliary server 154 that handles all access requests to and modifications of the access control tree 170. In other words, access requests (other than event notification access requests) whose target set is located in the access control tree 170 are routed by the MIS 150 to the special auxiliary server 154. Furthermore, all changes to the access control tree 170 result in the generation of event notifications that are sent to the event router 186. In particular, the creation of new access control objects, the deletion of access control objects, and the modification of the attributes of any access control object, all result in the generation of event notifications.

The MIS 150 and auxiliary servers 152 are all automatically registered in the event registry 184 to receive all event notifications related to changes in the access control tree 170. The MIS 150 and auxiliary servers are also included in a set of "super users" with access rights to all event notifications. Furthermore, among the library procedures shared by the MIS 150 and auxiliary servers 152 is an event receiving and processing procedure 262. When the MIS 150 and auxiliary servers 152 receive any event notifications indicating a change in the access control tree 170, the event processing procedure 262, which is invoked by each server, makes the same change to the servers local copy of the access control tree 170. As a result, the local copies of the access control tree 170 in each of the servers 150, 152 are updated virtually simultaneously.

Direct Database Access to Management Information

X.741 does not call for, or even suggest, SQL access to the management object database. In fact, direct access via a DBMS mechanism might be seen as contrary to the goals of X.741 since it is a potential source of security leaks. However, corporate customers of large communication networks are demanding direct "read only" access to management information for purposes of report generation.

The direct access mechanism of the present invention provides limited, read only access to management information using standard DBMS report generators to define and generate reports about the status or past performance of network objects. This is convenient for users, and avoids the complexities of network management information retrieval using SNMP (or any other network management protocol) when the only task to be performed is the generation of status reports and other network system analysis reports.

The direct access mechanism of the present invention only allows users access to information that would be granted if requested via the normal management interface to the network.

Figure 9:
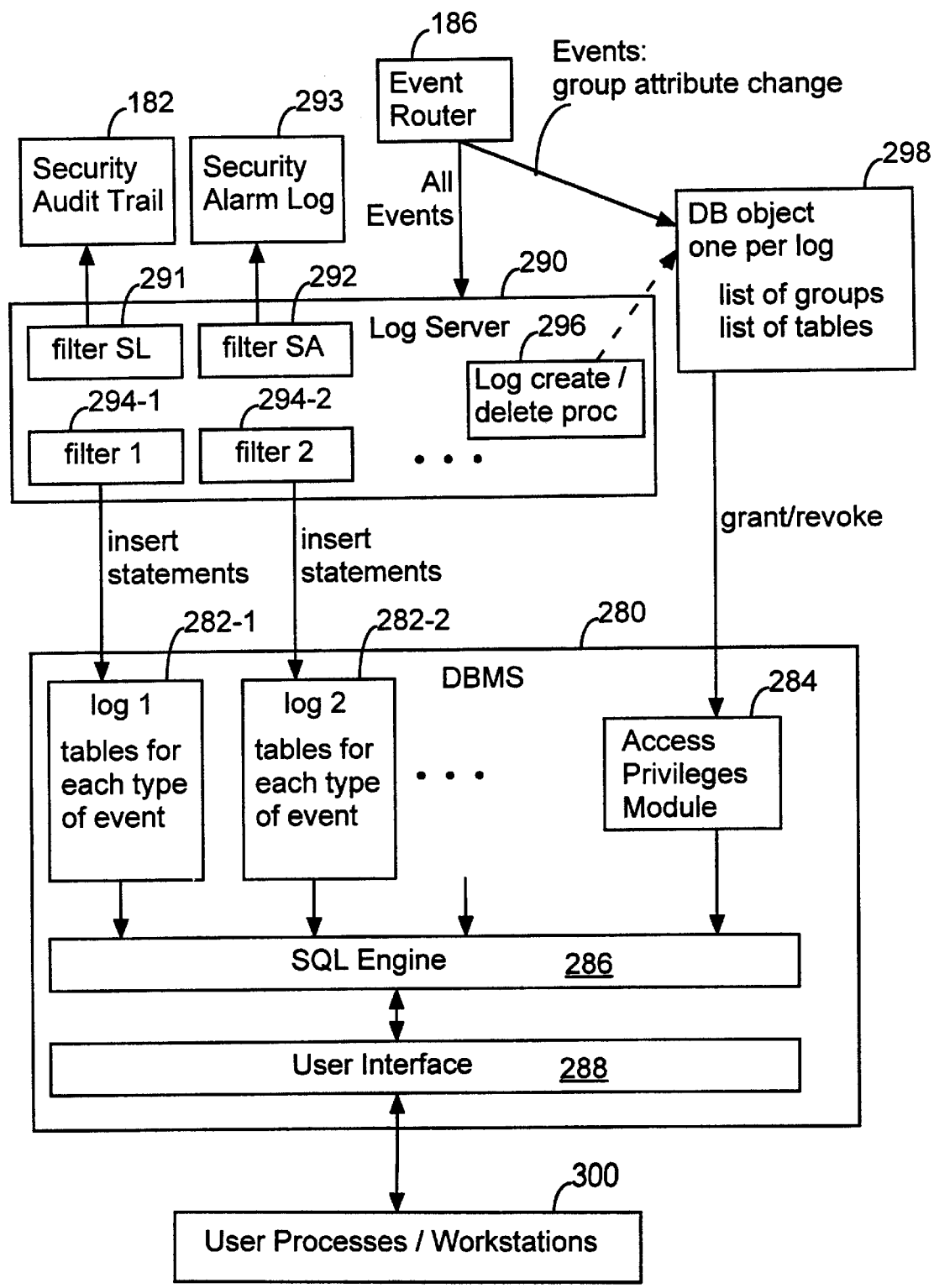
FIG. 9 depicts a supplemental access mechanism for providing SQL type read only access to log records, relating to event notifications generated by management objects, while maintaining the same security restrictions on access to management object information as that provided by the management information server for the network.

Referring to FIG. 9, the primary components of the direct information access mechanism are: a conventional database management system (DBMS) 280 for storing event logs 282, each of which stores event notifications to which various users have requested direct SQL type access; and a log server 290 whose primary function is to convert event notifications into SQL insert statements for storing event notifications in the event logs.

The DBMS 280, being conventional, stores tables of information. While FIG. 9 shows event logs 282, each event log is actual one or more database tables, where each database table stores a different type of event notification. The DBMS 280 also has an access privileges module 284 which configures (i.e., establishes) access rights to each of the tables in the DBMS. For instance, the access privileges module 284 may have an access privileges table that stores access rights information indicating which users have access to the tables that make up the event logs 282. However, the access privileges module 284 may be implemented in other ways, such as by storing access privileged information with each database table. The present application does not depend on the particular mechanism used by the access privileges module 284 to establish database table access rights.

In the preferred embodiment, only the log server 290 (besides the system administrator) has write access to the event log tables, while specified users have read access to specific tables. A standard SQL engine 286 processes insert statements from the log server 290 as well as read requests from user processes or workstations 300 that are submitted via a user communications interface 288.

The log server 290 is registered with the event registry to receive all event notifications generated by the system, and has corresponding access rights. The log server 290 is preferably a software entity or process that runs on the same computer or computer node as the MIS 150. A set of filters 291, 294 in the log server 290 determine which event notifications are stored, as well as where. A first filter 291 in the log server is called the security audit trail filter. This filter 291 passes "access grant" and "access denial" event notifications generated by the MIS 150 and auxiliary servers 152 (see FIG. 8). The security audit trail filter 291 can selectively store either the entire event notification, or a specified portion of it, in the security audit trail file 182. More specifically, when the security audit trail is configured to work in a detailed mode, the security audit trail 182 stores every access request and the corresponding outcome in its entirety. When the security audit trail is configured to work in an abbreviated mode, the security audit trail 182 stores a shortened representation of every access request and the corresponding outcome.

Another log server filter 292, called the security alarm filter, is used to generate a Security Alarm log 293 that is separate from the security audit trail 182, where security alarms are generated and stored in the log only when there is a denial of object access. In the preferred embodiment the stored security alarms identifies the user that initiated each denied access request.

The other type of log server filter shown in FIG. 9 are the event log filters 294. Each event log filter is set up to pass only a specified set of event notifications. For instance a particular customer might request that certain groups of its employees have direct access to all SNMP/CMIP event notifications for management objects assigned to that customer. The log create/delete procedure 296 is used to define a corresponding event log by:

(A) defining and initializing a corresponding set of DBMS tables 282 (i.e., an event log) for storing the requested event notifications (one distinct DBMS table per distinct event notification type);

(B) defining and creating a database object 298, and registering the database object 298 with the event registry to receive event notifications affecting the rights of users to receive those event notifications; the database object 298 includes a first attribute that contains a list of the DBMS tables in which the event log is stored, and a second attribute that contains a list of the groups with access rights to the event notifications;

(C) as group names are first added to the database object 298, the database object 298 sends an initial set of database table access grant commands to the DBMS to define the initial set of users with access rights to the tables making up the event log 282; and (D) defining and creating an event log filter 282 for passing only the requested event notifications and for converting them into SQL insert statements for inserting each passed event notification into a corresponding one of the DBMS tables.

For each event log 282 there are one or more corresponding target objects in the access control object tree 170 that define (1) the target set of management objects for which event notifications are to be stored in the event log, and (2) the types of event notifications to be included in the event log. For any particular event log, the set of groups of authorized users must be the same for all event notifications in that event log. Any changes in the groups of users to be granted access to the event log are communicated to the corresponding database object 198 by registering the database object with the event registry to receive event notifications about attribute changes to the target object(s) corresponding to the event log. The database object 298 is also registered to receive event notifications of attribute changes to the group objects for the groups that have access rights to the event log.

Whenever the database object 298 for a particular event log 282 is notified of a change (i.e., additions and/or deletions) in the membership of one of the groups with access rights to the event log 291, or a change in the set of groups to be given access to the event notifications in the event log, the database object 298 sends corresponding access grant and access revoke commands to the DBMS 280. The access privileges module 284 then reconfigures the database table access rights accordingly.

As event notifications corresponding to an event log are generated, they are forwarded by the event router 186 to the log server 290. The log server 290 forwards them to the event log's filter 294, where they are converted into SQL insert statements and sent to the DBMS 280 for storage. If some of the same event notifications are included in two (or more) different event logs 282, the same event notification will be stored two (or more) times in different tables of the DBMS.

The SQL engine 286 enforces previously defined access restrictions to the event logs. In particular, every user query for information from the tables in the DBMS is checked by the SQL engine 286 against the access rights established by the access privileges module 284, and only queries in full compliance with those access rights are processed. User queries requesting information from tables to which the user does not have access rights are rejected by the SQL engine 286.

Because user requests for information from the DBMS 280 must be submitted in the form of SQL queries, all the report generator tools available for the DBMS can be applied to creating SQL queries for management information. Thus, the DBMS access mechanism shown in FIG. 9 provides the convenience of using fast and well known DBMS access tools while still providing the same access restrictions as those provided by the management information server. Furthermore, the access restrictions imposed by the DBMS 280 are automatically updated whenever the access rights to the corresponding event notifications are modified in the main access control engine that controls access to information in the management object tree.

Alternate Embodiments

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. An access control system for controlling access to management objects in a distributed network, comprising:

an access control database, including access control objects, the access control objects including:
   group objects, each defining a group and a set of users who are members of the group; and
   rule objects, a subset of the rule objects each specifying: a set of the group objects, a set of the management objects, and access rights by the users who are members of the groups defined by the specified set of the group objects to the specified set of management objects; and a plurality of access control servers, each access control server controlling access to a distinct subset of the management objects in accordance with the access rights specified in the access control database; wherein at least one of the access control servers receives access requests from the users and distributes the received access requests among the access control servers for processing; a subset of the access requests specifying operations to be performed on specified sets of the management objects; wherein each access request in the subset is sent for processing to one or more of the access control servers in accordance with the management objects to which access is being requested by the access request;

the access control servers responding to the access requests from the users by granting, denying and partially granting and partially denying the access requested in each access request in accordance with the access rights specified in the access control database.

2. The access control system of claim 1, wherein one of the access control servers is a management information server that receives the access requests submitted by users to the access control system;

the management information server includes means for partitioning an access request into two or more access sub-requests when the access to the set of management objects specified by the access request is controlled by two or more of the access control servers and sending the access sub-requests to those two or more access control servers for processing; and the management information server includes means for combining responses to the two or more access sub-requests generated by the two or more of the access control servers after processing the access sub-requests and returning a combined response to the user who submitted the access request that was partitioned.

3. The access control system of claim 1, wherein a second subset of the rule objects in the access control database specify: a set of the group objects, a set of the access control objects, and access rights by the users who are members of the groups defined by the specified set of the group objects to the specified set of access control objects; and the access control system includes an access control database server that stores the access control database in persistent storage, receives access requests to the access control objects, grants and denies the access requests to the access control object in accordance with the access rights specified in the access control database.

4. The access control system of claim 1, wherein a second subset of the rule objects in the access control database each specify: a set of the group objects, a set of the management objects, and access rights by the users who are members of the groups defined by the specified set of the group objects to event notifications generated by the specified set of management objects; and the access control system includes an event router that receives event notifications generated by the management objects and sends corresponding event notification messages only to users in groups who have access rights to those event notifications in accordance with the access rights specified in the access control database.

5. The access control system of claim 4, wherein the access control system includes an event registry for registering event notification requests by users, each event notification request specifying event notifications from specified sets of the management objects that are being requested;

the event router including means for sending, in response to each received event notification, corresponding event notification messages to users who have registered a corresponding event notification request with the event registry and also have access rights to the received event notification in accordance with the access rights specified in the access control database.

6. A method of controlling access to management objects in a distributed network, comprising the steps of:

storing a set of access control objects, the access control objects including:

group objects, each defining a group and a set of users who are members of the group; and rule objects, a subset of the rule objects each specifying: a set of the group objects, a set of the management objects, and access rights by the users who are members of the groups defined by the specified set of the group objects to the specified set of management objects; and receiving access requests from the users and distributing the received access requests among a plurality of access control servers for processing; a subset of the access requests specifying operations to be performed on specified sets of the management objects; each access control server controlling access to a distinct subset of the management objects in accordance with the access rights specified in the access control database; wherein at least one of the access control servers; wherein each access request in the subset is sent for processing to one or more of the access control servers in accordance with the management objects to which access is being requested by the access request;

at the access control servers, responding to the access requests from the users by granting, denying and partially granting and partially denying the access requested in each access request in accordance with the access rights specified in the access control database.

7. The access control method of claim 6, wherein receiving at one of the access control servers all the access requests submitted by users;

at the one access control server, partitioning an access request into two or more access sub-requests when the access to the set of management objects specified by the access request is controlled by two or more of the access control servers and sending the access sub-requests to those two or more access control servers for processing; and at the one access control server, combining responses to the two or more access sub-requests generated by the two or more of the access control servers after processing the access sub-requests and returning a combined response to the user who submitted the access request that was partitioned.

8. The access control method of claim 6, wherein a second subset of the rule objects in the access control database specify: a set of the group objects, a set of the access control objects, and access rights by the users who are members of the groups defined by the specified set of the group objects to the specified set of access control objects; and at an access control database server, storing the access control database in persistent storage, receiving access requests to the access control objects, granting and denying the access requests to the access control object in accordance with the access rights specified in the access control database.

9. The access control method of claim 6, wherein a second subset of the rule objects in the access control database each specify: a set of the group objects, a set of the management objects, and access rights by the users who are members of the groups defined by the specified set of the group objects to event notifications generated by the specified set of management objects; and at an event router, receiving event notifications generated by the management objects and sending corresponding event notification messages only to users in groups who have access rights to those event notifications in accordance with the access rights specified in the access control database.

10. The access control method of claim 9, wherein at an event registry, registering event notification requests by users, each event notification request specifying event notifications from specified sets of the management objects that are being requested;

at the event router, sending, in response to each received event notification, corresponding event notification messages to users who have registered a corresponding event notification request with the event registry and also have access rights to the received event notification in accordance with the access rights specified in the access control database.

11. A computer program product for use in conjunction with a plurality of access control servers in a distributed network, the computer program product comprising a computer readable storage medium and a computer program mechanism embedded therein, the computer program mechanism comprising:

an access control database, including access control objects, the access control objects including:

group objects, each defining a group and a set of users who are members of the group; and rule objects, a subset of the rule objects each specifying: a set of the group objects, a set of the management objects, and access rights by the users who are members of the groups defined by the specified set of the group objects to the specified set of management objects; and access control procedures, to be executed by the plurality of access control servers, each access control server controlling access to a distinct subset of the management objects in accordance with the access rights specified in the access control database; the access control procedures including a routing procedure, to be executed by at least one of the access control servers, for receiving access requests from the users and distributing the received access requests among the access control servers for processing; a subset of the access requests specifying operations to be performed on specified sets of the management objects; wherein each access request in the subset is sent for processing to one or more of the access control servers in accordance with the management objects to which access is being requested by the access request;

the access control procedures including instructions for responding to the access requests from the users by granting, denying and partially granting and partially denying the access requested in each access request in accordance with the access rights specified in the access control database.

12. The computer program product of claim 11, wherein the routing procedure includes instructions for partitioning an access request into two or more access sub-requests when the access to the set of management objects specified by the access request is controlled by two or more of the access control servers and for sending the access sub-requests to those two or more access control servers for processing; and the access control procedures include a request response combining procedure that combines responses to the two or more access sub-requests generated by the two or more of the access control servers after processing the access sub-requests and returns a combined response to the user who submitted the access request that was partitioned.

13. The computer program product of claim 11, wherein a second subset of the rule objects in the access control database specify: a set of the group objects, a set of the access control objects, and access rights by the users who are members of the groups defined by the specified set of the group objects to the specified set of access control objects; and the access control procedures includes instructions for receiving receives access requests to the access control objects, and grants and denies the access requests to the access control object in accordance with the access rights specified in the access control database.

14. The computer program product of claim 11, wherein a second subset of the rule objects in the access control database each specify: a set of the group objects, a set of the management objects, and access rights by the users who are members of the groups defined by the specified set of the group objects to event notifications generated by the specified set of management objects; and the access control procedures includes an event router that receives event notifications generated by the management objects and sends corresponding event notification messages only to users in groups who have access rights to those event notifications in accordance with the access rights specified in the access control database.

15. The computer program product of claim 14, further including an event registry for registering event notification requests by users, each event notification request specifying event notifications from specified sets of the management objects that are being requested;

wherein the event router includes instructions for sending, in response to each received event notification, corresponding event notification messages to users who have registered a corresponding event notification request with the event registry and also have access rights to the received event notification in accordance with the access rights specified in the access control database.

* * * * *